United States Patent
Zähringer et al.

(10) Patent No.: US 6,872,379 B2
(45) Date of Patent: Mar. 29, 2005

(54) METHOD FOR THE REFORMATION OF FUELS, IN PARTICULAR HEATING OIL

(75) Inventors: Thomas Zähringer, Winterthur (CH); Alexander Schuler, Weisslingen (CH)

(73) Assignee: Sulzer Hexis AG, Winterthur (CH)

( * ) Notice: Subject to any disclaimer, the term of this patent is extended or adjusted under 35 U.S.C. 154(b) by 185 days.

(21) Appl. No.: 10/210,541

(22) Filed: Jul. 31, 2002

(65) Prior Publication Data
US 2003/0033753 A1 Feb. 20, 2003

(30) Foreign Application Priority Data
Aug. 15, 2001 (EP) .............................. 01810784

(51) Int. Cl.$^7$ .............................. C01B 3/26; B01J 8/02; H01M 8/00
(52) U.S. Cl. ............................ 423/651; 48/212; 48/215; 252/373; 422/211; 422/220; 422/222; 422/234; 429/13
(58) Field of Search ................ 48/212, 214 A, 48/214 R, 215; 252/373; 422/211, 220, 222, 234; 423/418.2, 651; 429/13

(56) References Cited
U.S. PATENT DOCUMENTS

| | | | |
|---|---|---|---|
| 4,788,004 A | * | 11/1988 | Pinto et al. .................. 252/373 |
| 6,045,772 A | | 4/2000 | Szydlowski et al. |
| 6,221,280 B1 | * | 4/2001 | Anumakonda et al. ..... 252/372 |

FOREIGN PATENT DOCUMENTS

| | | |
|---|---|---|
| DE | 19934649 A1 | 1/2001 |
| EP | 0287238 A2 | 10/1988 |
| WO | WO 01/46068 A1 | 6/2001 |

\* cited by examiner

*Primary Examiner*—Stanley S. Silverman
*Assistant Examiner*—Maribel Medina
(74) *Attorney, Agent, or Firm*—Townsend and Townsend and Crew LLP

(57) ABSTRACT

The method for the reformation of fuels, in particular of heating oil (20') and of another liquid fuel is carried out using an oxygen containing gas (5a, 5b, 21', 22'). The method includes the following steps:

formation of a fuel/gas mixture by dispersing of the fuel in a jet of the oxygen containing gas (21');

additionally an admixture of gas of a return flow (3b) and vaporization of the dispersed fuel;

generation of synthesized gas from the gas mixture by means of partial oxidation and also reformation processes by heterogeneous catalysis;

branching off of the produced synthesized gas into a product flow (3a) and the return flow (3b) for a recirculation; and a regulated extraction of heat from the return flow for the setting of a predetermined temperature of a catalyst support (10) on which the heterogeneous catalysis takes place.

15 Claims, 2 Drawing Sheets

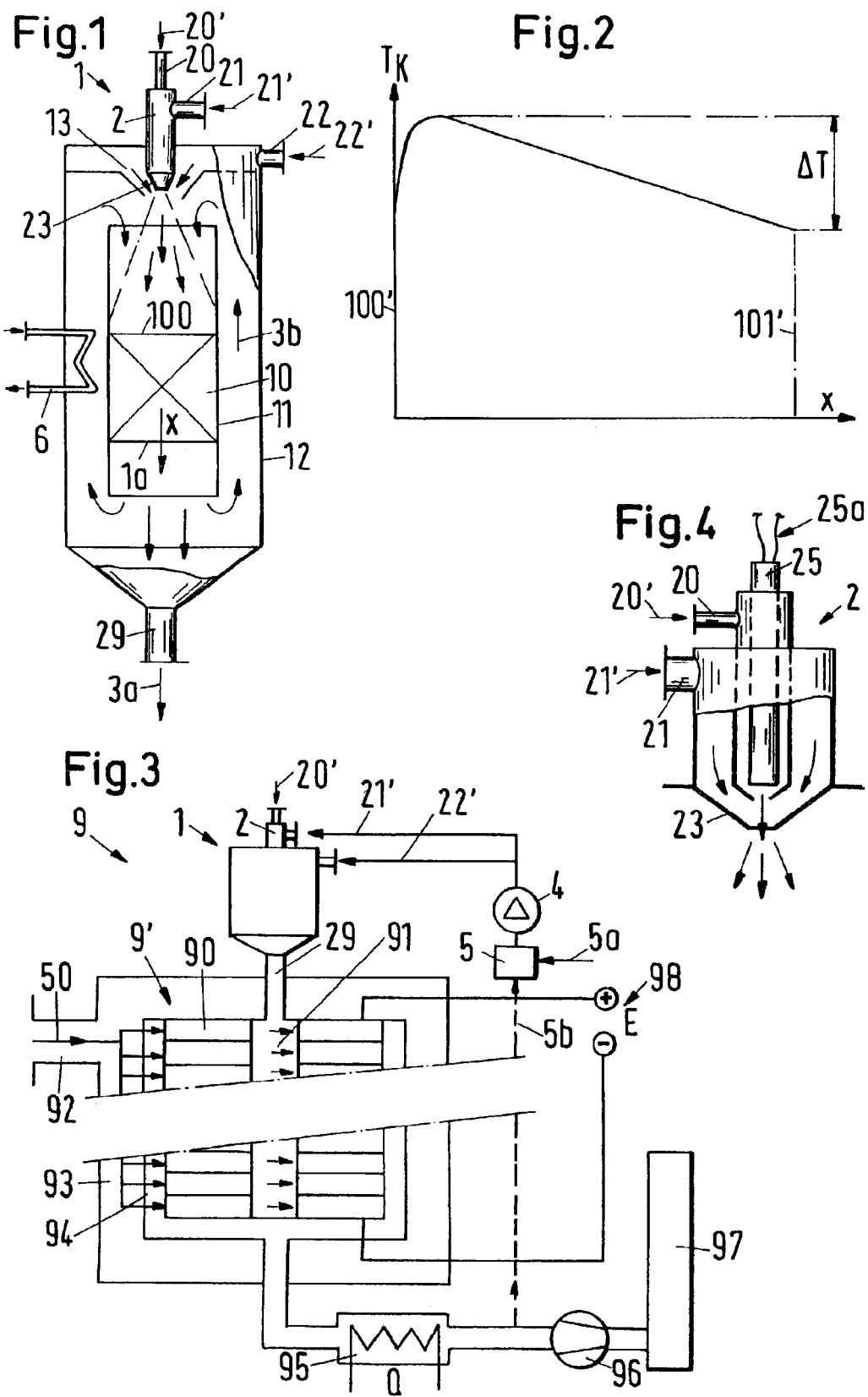

METHOD FOR THE REFORMATION OF FUELS, IN PARTICULAR HEATING OIL

BACKGROUND OF THE INVENTION

The invention relates to a method for the reformation of fuels, in particular of heating oil or another liquid fuel, preferably for the purpose of obtaining electrical and thermal energy by means of high temperature fuel cells. The invention also relates to apparatuses for carrying out the method and also to a plant with fuel cells in which the method of the invention is used.

The reformation of hydrocarbons, which are for example present in the form of fuel gas or vaporized heating oil, can be carried out catalytically at around 800° C. with the admixture of water in vapor form and a supply of heat. During the reformation, carbon monoxide and hydrogen arise which, as educts, can be used for electrochemical processes in high temperature fuel cells, for example in the battery of fuel cells as is known from EP-A-0 780 917. This battery contains a cell block with fuel cells which is surrounded by a heat insulating sleeve. An afterburning space is located between the sleeve and the cell block. A reformer (also termed a pre-reformer) which is suitable only for the preparation of a gaseous fuel is arranged in the sleeve. It is connected to a heat exchanger by means of which the heat required for the reformation processes can be supplied to it from exhaust gases.

When air or another oxygen containing gas which is composed of an inert component and of a component consisting of molecular oxygen $O_2$ is admixed to the hydrocarbons a partial oxidation takes place in parallel to the endothermic reformation processes, the partial oxidation is exothermic and water arises as a reaction product. The water formed by the partial oxidation serves as an educt of the reformation. An admixture of water is thus no longer required or only partly required, which is advantageous since water is expensive having regard to the demands made on its purity. However a problem arises when the reformation is carried out together with a partial oxidation, as the following explanations show:

The reformation processes are carried out by a heterogeneous catalysis in a catalytic converter with a uniform structure. The catalytic converter consists of a catalyst support, on the surface of which the catalytically active material, namely a platinum material (in particular platinum, rhodium or palladium), nickel or a mixture of such metals, is applied. The oxidation which takes place simultaneously does so much more quickly then the endothermic reformation reaction; it thus takes place in an inlet region of the catalytic converter in which high temperatures arise as a result of the heat output through the oxidation. These temperatures can result in a deactivation of catalytically active metals, for example by vaporization, and thus damage to the catalytic converter.

SUMMARY OF THE INVENTION

An object of the invention is to provide a method for the reformation of a fuel, in particular heating oil or another liquid fuel, in which a partial oxidation is carried out simultaneously with the reformation but in which a damaging effect of the exothermic processes on the catalytic converter is avoided. This object is attained in that with a return of synthesized gas the temperature in the inlet region of the catalytic converter can be reduced so far that thermal damage is prevented.

The method for the reformation of fuels, in particular heating oil or another liquid fuel, is carried out using an oxygen containing gas. The method comprises the following steps:

formation of a fuel/gas mixture by dispersing of the fuel in a jet of the oxygen containing gas;

additionally an admixture of gas of a return flow and vaporization of the dispersed fuel;

generation of synthesized gas from the gas mixture by means of partial oxidation and also reformation processes by heterogeneous catalysis;

branching off of the produced synthesized gas into a product flow and the return flow for a recirculation; and a regulated extraction of heat from the return flow for the setting of a predetermined temperature of a catalyst support on which the heterogeneous catalysis takes place.

In the following the invention will be explained with reference to the drawings.

BRIEF DESCRIPTION OF THE DRAWINGS

FIG. 1 shows an apparatus for carrying out the method of the invention,

FIG. 2 is a diagram with a temperature profile which results with partial oxidation and simultaneous reformation in a catalytic converter, FIG. 3 shows a plant with a battery of high temperature fuel cells and an apparatus in accordance with the invention for the reformation of heating oil, FIG. 4 shows a particular two-material nozzle.

DESCRIPTION OF THE PREFERRED EMBODIMENTS

Figure 5:
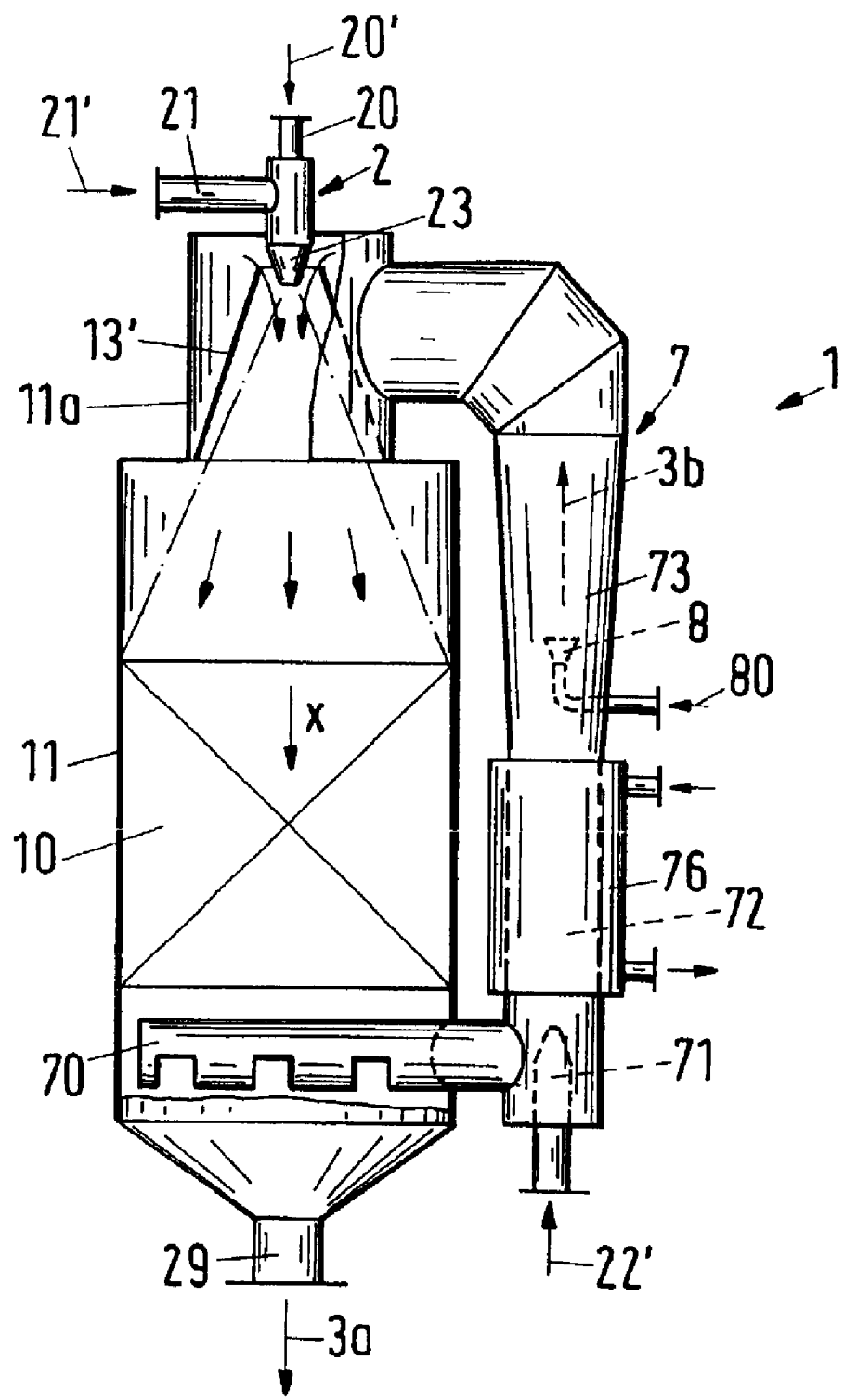
FIG. 5 shows a second embodiment of the apparatus of the invention.

The method of the invention can be carried out with the apparatus shown in FIG. 1. A heating oil/gas mixture is sprayed into the apparatus 1 by means of a two-material nozzle 2 which has a central infeed 20 for heating oil 20', a lateral infeed 21 for an oxygen containing gas 21' and a nozzle tip 23. In this connection a further part flow 22' of the oxygen containing gas is united with the heating oil/gas mixture via an infeed 22 and a ring-like nozzle 13. (The method of the invention can also be carried out without this part flow.) At the outlet of the nozzle 13 the emerging jet brings about a depression by which the gas of a hot return flow 3b is sucked in. Heat is supplied to the dispersed heating oil, which can be fed cold into the two-material nozzle 2, by mixing of this hot gas with the jet of the nozzle 13 so that the heating oil is vaporized. A radiation of heat through the hot catalytic converter 10 contributes to heating of the dispersed heating oil so that the heat required for the vaporization does not have to be supplied solely by the return flow 3b.

The two-material nozzle 2 is arranged at a distance remote from the catalytic converter 10, with the distance to an entry surface 100 being sufficiently large that an adequately long dwell time exists for the vaporization of the heating oil prior to the inlet and that the mixture enters into the catalytic converter 10 distributed over the full entry surface 100. The catalytic converter 10 is located in a first cylindrical tube 11. A second cylindrical tube 12 forms part of an outer wall of the apparatus 1. The catalytically produced synthesized gas is branched off below an outlet surface into a product flow 3a and the return flow 3b. The product flow 3a leaves the apparatus 1 through an outlet tube 29. The return flow 3b, driven by a pressure drop which arises as a result of the depression at the nozzle 13, is guided upwardly through a recirculation gap, which is a ring space between the two tubes 11 and 12. Heat is extracted from the return flow 3b by means of a heat exchanger 6. With a regulated extraction of heat the temperature $T_K$ of the catalytic converter 10 can be influenced so that, for example, the average temperature adopts a predetermined value.

The temperature $T_K$ has a profile as is qualitatively illustrated in the diagram of FIG. 2. The x-axis, the direction of which is drawn in in FIG. 1, extends in the main flow direction of the catalytic converter 10. The left-hand line 100' of the diagram corresponds to the inlet surface 100, the right-hand line 101' corresponds to the outlet surface. As already mentioned the temperature has a maximum in the inlet region as a result of the exothermic processes. The endothermic processes of the reformation bring about a gradual reduction of the temperature after the maximum. The temperature interval $\Delta T$ quoted must lie within an interval, the limits of which are given by a required minimum temperature of around 700° C. and a maximum permissible temperature of around 1000° C. This condition cannot be satisfied without the measure of the invention.

Due to the return flow 3b the temperature interval $\Delta T$ of the temperature profile is smaller and the average temperature can be set lower. The reduction of $\Delta T$ results for two reasons: a) The partial pressure of the heated oil vapor is reduced by the returned gas (increase of the proportion of inert gas); and b) Water is already made available in the inlet region of the catalytic converter (water which arises in the process) for the reformation processes and thus produces a heat sink. These two reasons also have the advantageous effect that soot formation in the catalytic converter 10 is suppressed.

With regard to the recirculation, the packing should have a structure which produces the smallest possible flow resistance. An ordered packing is of advantage, the structure of which is a honeycomb structure with parallel flow passages or a structure with wave-shaped foils and open, crossing, flow passages ("crossed channel structure"). A reticular foam structure or a structure of a three-dimensional braid is also possible.

The plant 9 shown in FIG. 3 comprises a battery 9' in the form of a stack of planar ring-line high temperature fuel cells 90 and an apparatus 1 in accordance with the invention for the reformation of heating oil. Apart from the fuel cells 90 the following components can be seen: a sleeve 93 which has a non-illustrated internal construction by means of which environmental air 50 (inlet 92) is preheated during operation and uniformly distributed to the cell stack; an afterburning space 94 between cell stack 9' and sleeve 93 from which waste heat is led away via a heat exchanger 95 (transfer of heat Q to a water circuit, for example); a fan 96 with which the exhaust gas is sucked away and conveyed into a chimney 97; a pole 98 for the transmission of electrical energy E to a consumer.

Oxygen-containing gas forwarded by a pump 4 is fed into the apparatus 1 with the two partial flows 21' and 22'. Environmental air 5a and/or exhaust gas 5b from an afterburning of the fuel cell battery 9' is used as the oxygen containing gas. In a mixing apparatus 5 an ideal ratio of environmental air 5a and exhaust gas 5b is produced. The product gas for the reformation is fed through the line 29 into a central distributor passage 91 of the battery 9'.

FIG. 4 shows a special two-material nozzle 2. This contains a heating cartridge 25 (electrical connections 25a) with which the heating oil 20' can be preheated to 400–420° C. to assist the vaporization or to carry it out.

A second embodiment of the apparatus of the invention is shown in FIG. 5. For the return flow 3b a second tube 7 is added to the first tube 11 containing the catalytic converter 10, with the second tube 7 being formed as a jet compressor. The second part flow 22' and the oxygen containing gas are exploited as a driving medium. Synthesized gas is sucked in through a tube 70 by a driving nozzle 71. A subsequent downstream tube element 72, in which a momentum transfer takes place from the driving medium to the synthesized gas, is formed as a heat exchanger 76 which corresponds to the heat exchanger 6 in the embodiment of FIG. 1. In a subsequent diffuser 73, deionized water 80 can be sprayed by a nozzle 8 into the return flow 3b in order to utilize this fed-in water 80 as a reaction component of the reformation processes and for a cooling of the returned synthesized gas. The return flow 3b conveyed by means of the jet compressor 7 is distributed in the upper part of the apparatus 1 between an outer wall 11a and a truncated cone-like wall 13' around a two-material nozzle 2. The gas of return flow 3b is united through the ring gap at the nozzle tip 23 with the heating oil/gas mixture emerging from the nozzle 2 and supplied to the catalytic converter 10. The nozzle 2 can also be of the type shown in FIG. 4.

For the complete vaporization of the heating oil the return gas must be sufficiently hot that a temperature of around 250–300° C. is achieved. When gas is recirculated with a temperature of 900° C. then the ratio of the return flow to the product flow must amount to around 1:4. The higher the recirculation ratio is selected, the more uniform is the temperature profile in the catalytic converter. A ratio greater than 1 is however not sensible for economic reasons, since the driving of the recirculation flow becomes expensive due to a high requirement of the momentum input.

The momentum required for the recirculation can be made available by means of the reaction air in different ways. The reaction air can be fed in in total via the two-material nozzle, which results in a fine atomization that is associated with a relatively large energy requirement. The reaction air can be fed in subdivided into primary and secondary air, the primary air in the two-material nozzle and the secondary air for example in a jet compressor. This second way is however more expensive apparatus-wise.

When carrying out an autotherm reformation in which water is used as a reaction agent in addition to air the water can be exploited for the regulation of the reaction temperature; the water can then be injected into the recirculation gap.

The method of the invention can also be carried out with liquid fuels such as methanol, ethanol or "biodiesel" (vegetable oil). Moreover gaseous fuels (natural gas, liquid gas, biogas) can be used when the method of the invention is modified somewhat (no vaporization of the fuel). With these fuels, which have a lower adiabatic temperature increase than heating oil, the conversion or turnover can be improved by a supply of heat—for example into the recirculation gap.

What is claimed is:

1. A method for continuously reforming a liquid fuel as part of an ongoing production process comprising:
    providing the liquid fuel and a gas containing an inert component and an $O_2$ component;
    forming a fuel/gas mixture with the liquid fuel and the gas by dispersing the liquid fuel in a flow of the gas;
    discharging the liquid fuel/gas mixture through a nozzle and creating a relatively lower pressure in the liquid fuel/gas mixture at a discharge side of the nozzle;

vaporizing the liquid fuel in the fuel/gas mixture to thereby form a vaporized fuel/gas mixture;

subjecting the vaporized fuel/gas mixture to partial oxidation and a reformation process by heterogeneous catalysis in a catalyst support to thereby generate a heated synthesized gas containing an $O_2$ component;

dividing the synthesized gas into a product flow and a return flow;

cooling the return flow to lower the temperature of the synthesized gas therein; and using the relatively low pressure at the discharge side of the nozzle for flowing the return flow towards the discharge side of the nozzle to thereby mix the return flow with and cause a heating of the liquid fuel/gas mixture and facilitate vaporization of the liquid fuel.

2. A method according to claim 1 including providing the catalyst support having a relatively low flow resistance.

3. A method according to claim 2 including selecting the catalyst support from the group of supports consisting of a structure having parallel flow channels, a structure made of wave-shaped foils and crossing flow channels, a reticular foam structure, and a structure of a three-dimensional braid.

4. A method according to claim 1 wherein cooling comprises adding deionized water to the return flow.

5. A method according to claim 4 including using the deionized water in the return flow for at least one of a reaction component in the reformation process and as a coolant for the return flow.

6. A method according to claim 1 wherein cooling comprises extracting heat from the return flow.

7. A method according to claim 1 wherein forming the liquid fuel/gas mixture comprises infeeding the $O_2$ component of the gas with a pump and dividing the $O_2$ component gas into first and second $O_2$ gas flows, and wherein the first $O_2$ gas flow is combined with the fuel being dispersed, and the second $O_2$ gas flow is directed through a driving nozzle into the return flow.

8. A method according to claim 1 including using the product flow in a fuel cell battery which includes an afterburner, and wherein providing the $O_2$ component comprises using at least one of environmental air and an exhaust gas from the afterburner of the fuel cell battery as the $O_2$-containing gas.

9. An apparatus for continuously reforming a liquid fuel as part of an ongoing production process for subsequent use, the apparatus comprising:

a catalytic converter having an inlet surface, a support structure, a catalytically active substance applied to the support structure, and an outlet surface for discharging a reformed fuel/gas mixture generated in the catalytic converter;

a first tube surrounding the catalytic converter;

a nozzle having first and second inputs for the liquid fuel and for an $O_2$ containing gas for mixing the liquid fuel and the gas into a liquid fuel/gas mixture and an outlet from which the liquid fuel/gas mixture emerges and thereby creates a relatively lower pressure in a vicinity of the nozzle, the nozzle outlet being further arranged at a distance from the inlet surface of the catalytic converter which is sufficient to provide a dwell time before the liquid fuel/gas mixture reaches the inlet surface and enters the catalytic converter during which the liquid fuel is vaporized and a resulting vaporized fuel/gas mixture becomes distributed over substantially the full inlet surface; and a conduit in flow communication with the vicinity of the nozzle and the outlet area of the catalytic converter so that the relatively lower pressure in the vicinity of the nozzle induces the recirculation of a portion of the reformed fuel/gas mixture from the catalytic converter towards the nozzle for heating the liquid fuel/gas mixture sufficiently to vaporize substantially all liquid fuel in the mixture.

10. An apparatus according to claim 9 wherein the conduit is defined by the first tube and a surrounding second tube that is spaced from the first tube.

11. An apparatus according to claim 9 wherein the conduit comprises a second tube arranged outside the first tube and configured as a jet compressor for the return flow, and wherein a portion of the $O_2$-containing gas is used as a driving medium for the return flow.

12. An apparatus according to claim 9 wherein the nozzle comprises a central nozzle for the liquid fuel and a ring nozzle for the $O_2$-containing gas.

13. An apparatus according to claim 12 including a heating cartridge located in the central nozzle for preheating the liquid fuel.

14. An apparatus according to claim 9 including a heat exchanger for extracting heat from the portion of the reformed fuel/gas mixture being recirculated.

15. A fuel cell plant comprising:

a battery of high-temperature fuel cells;

a catalytic converter having an inlet surface, an outlet surface, a support structure, a catalytically active substance applied to the support structure, and an outlet surface for discharging a reformed fuel/gas mixture generated in the catalytic converter;

a first tube surrounding the catalytic converter;

a nozzle having first and second inputs for the liquid fuel and for an $O_2$ containing gas for mixing the liquid fuel and the gas into a liquid fuel/gas mixture and an outlet from which the liquid fuel/gas mixture emerges and thereby creates a relatively lower pressure in a vicinity of the nozzle, the nozzle outlet being further arranged at a distance from the inlet surface of the catalytic converter which is sufficient to provide a dwell time before the liquid fuel/gas mixture reaches the inlet surface and enters the catalytic converter during which the liquid fuel is vaporized and a resulting vaporized fuel/gas mixture becomes distributed over substantially the full inlet surface;

a first conduit for recirculating a portion of the reformed fuel/gas mixture from the catalytic converter to the nozzle for heating the liquid fuel/gas mixture sufficiently to vaporize substantially all liquid fuel therein; and a second conduit for flowing another portion of the reformed fuel/gas mixture from the catalytic converter to the high-temperature fuel cell battery for using hydrogen and carbon monoxide in the other portion of the reformed fuel/gas mixture as reducing reactants of electrochemical processes occurring during the generation of electrical energy in the battery of fuel cells.

* * * * *